(12) United States Patent
Dwivedi et al.

(10) Patent No.: US 11,516,094 B2
(45) Date of Patent: Nov. 29, 2022

(54) SERVICE REMEDIATION PLAN GENERATION

(71) Applicant: International Business Machines Corporation, Armonk, NY (US)

(72) Inventors: Aditya Dwivedi, New Delhi (IN); Padmanabha Venkatagiri Seshadri, Mysore (IN); Arun Kumar, Noida (IN); Amith Singhee, Bangalore (IN); Kuntal Dey, New Delhi (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/110,569

(22) Filed: Dec. 3, 2020

(65) Prior Publication Data
US 2022/0182296 A1   Jun. 9, 2022

(51) Int. Cl.
*H04L 41/5025* (2022.01)
*H04L 41/5041* (2022.01)
(Continued)

(52) U.S. Cl.
CPC ...... *H04L 41/5025* (2013.01); *H04L 41/5006* (2013.01); *H04L 41/5048* (2013.01); *H04L 67/61* (2022.05)

(58) Field of Classification Search
CPC ............. H04L 41/5025; H04L 41/5048; H04L 67/322; H04L 41/5006
See application file for complete search history.

(56) References Cited

U.S. PATENT DOCUMENTS

| 7,698,275 B2 | 4/2010 | O'Brien et al. |
| 9,021,310 B1 | 4/2015 | McCabe et al. |

(Continued)

OTHER PUBLICATIONS

Guilherme Sperb Machado et al., "Refined Failure Remediation for IT Change Management Systems", 2009, 8 pages, IEEE Digital Library.

(Continued)

*Primary Examiner* — Umar Cheema
*Assistant Examiner* — James Ross Hollister
(74) *Attorney, Agent, or Firm* — Ference & Associates LLC

(57) ABSTRACT

One embodiment provides a computer implemented method, including: receiving interaction logs of a plurality of services of an application running on a system; generating an interaction graph identifying interactions between at least the at least one of the plurality of services and other of the plurality of services, wherein the identifying comprises identifying a frequency of interactions between services; determining constraints between at least the at least one of the plurality of services and the other of the plurality of services, wherein the constraints identify services that are dependent upon other services of the plurality of services and a compatibility of services with respect to other services of the plurality of services; and creating a remediation plan for updating the at least one of the plurality of services, wherein the remediation plan identifies a time for updating the at least one of the plurality of services.

20 Claims, 6 Drawing Sheets

(51) Int. Cl.
*H04L 41/5006* (2022.01)
*H04L 67/61* (2022.01)

(56) References Cited

U.S. PATENT DOCUMENTS

| | | | |
|---|---|---|---|
| 9,286,035 | B2 | 3/2016 | Sundararam |
| 9,436,826 | B2 | 9/2016 | Kapoor et al. |
| 9,559,928 | B1* | 1/2017 | Porter ................. G06F 11/3612 |
| 9,684,524 | B1* | 6/2017 | Porter ................. G06F 11/3433 |
| 10,091,061 | B1* | 10/2018 | Peterson ............. H04L 41/0823 |
| 10,177,988 | B2 | 1/2019 | Maes |
| 10,235,227 | B2 | 3/2019 | Purushothaman et al. |
| 10,244,081 | B2 | 3/2019 | Ananthanarayanan et al. |
| 10,277,622 | B2 | 4/2019 | DiGiambattista et al. |
| 10,282,550 | B1 | 5/2019 | Sheridan et al. |
| 2006/0080656 | A1* | 4/2006 | Cain ........................ G06F 8/65 434/118 |
| 2006/0191012 | A1* | 8/2006 | Banzhof .......... G06Q 10/06311 726/25 |
| 2014/0317413 | A1 | 10/2014 | Deutsch et al. |
| 2017/0024225 | A1* | 1/2017 | Kludy ................... G06F 9/4416 |
| 2017/0206359 | A1* | 7/2017 | Harper .................... G06F 21/53 |
| 2018/0211042 | A1 | 7/2018 | Reinecke |
| 2019/0129788 | A1 | 5/2019 | Fields et al. |
| 2021/0029204 | A1* | 1/2021 | Bhatnagar ............... H04L 43/16 |
| 2021/0165694 | A1* | 6/2021 | Nabi ..................... G06F 9/5027 |

OTHER PUBLICATIONS

Jurgen Etzlstorfer, "A framework for self-healing applications—the path to enable auto-remediation", DWX Developer Week, Jun. 27, 2018, Nurnberg, Germany, 31 pages.

Steffen Lehnert, "A review of software change impact analysis", Technische Universitat limenau, 2011, 39 pages, ilmedia.

* cited by examiner

SERVICE REMEDIATION PLAN GENERATION

BACKGROUND

Services, software, and other systems generally are expected to comply with certain requirements or regulations. Failing to comply with the requirements or regulations could mean that the systems are not performing as intended or expected from a user perspective. For example, if a service is being run on a cloud environment that is accessible to many different users or entities, if the service is out-of-compliance, for example, with respect to security of the service, all of the users and entities could be affected by the non-compliance. This could mean that any data that the users or entities store or share with the service could be susceptible to attacks or security breaches. Thus, the users or entities that are responsible for maintaining the systems periodically check the systems to ensure that the system is still in compliance, for example, through auditing of the system. If the system is not compliant, the user or other entity will remediate or update the system to restore compliance.

BRIEF SUMMARY

In summary, one aspect of the invention provides a computer implemented method, including: receiving interaction logs of a plurality of services of an application running on a system, wherein at least one of the plurality of services requires updating; generating, from the interaction logs, an interaction graph identifying interactions between at least the at least one of the plurality of services and other of the plurality of services, wherein the identifying interactions comprises identifying a frequency of interactions between services of the plurality of services; determining, from the interaction graph, constraints between at least the at least one of the plurality of services and the other of the plurality of services, wherein the constraints identify services that are dependent upon other services of the plurality of services and a compatibility of services with respect to other services of the plurality of services; and creating, based upon the constraints and interaction graph, a remediation plan for updating the at least one of the plurality of services, wherein the remediation plan identifies a time for updating the at least one of the plurality of services to reduce remediation plan implementation effects on others of the plurality of services.

Another aspect of the invention provides an apparatus, including: at least one processor; and a computer readable storage medium having computer readable program code embodied therewith and executable by the at least one processor; wherein the computer readable program code comprises code that receives interaction logs of a plurality of services of an application running on a system, wherein at least one of the plurality of services requires updating; wherein the computer readable program code comprises code that generates, from the interaction logs, an interaction graph identifying interactions between at least the at least one of the plurality of services and other of the plurality of services, wherein the identifying interactions comprises identifying a frequency of interactions between services of the plurality of services; wherein the computer readable program code comprises code that determines, from the interaction graph, constraints between at least the at least one of the plurality of services and the other of the plurality of services, wherein the constraints identify services that are dependent upon other services of the plurality of services and a compatibility of services with respect to other services of the plurality of services; and wherein the computer readable program code comprises code that creates, based upon the constraints and interaction graph, a remediation plan for updating the at least one of the plurality of services, wherein the remediation plan identifies a time for updating the at least one of the plurality of services to reduce remediation plan implementation effects on others of the plurality of services.

An additional aspect of the invention provides a computer program product, including: a computer readable storage medium having computer readable program code embodied therewith, the computer readable program code executable by a processor; wherein the computer readable program code comprises code that receives interaction logs of a plurality of services of an application running on a system, wherein at least one of the plurality of services requires updating; wherein the computer readable program code comprises code that generates, from the interaction logs, an interaction graph identifying interactions between at least the at least one of the plurality of services and other of the plurality of services, wherein the identifying interactions comprises identifying a frequency of interactions between services of the plurality of services; wherein the computer readable program code comprises code that determines, from the interaction graph, constraints between at least the at least one of the plurality of services and the other of the plurality of services, wherein the constraints identify services that are dependent upon other services of the plurality of services and a compatibility of services with respect to other services of the plurality of services; and wherein the computer readable program code comprises code that creates, based upon the constraints and interaction graph, a remediation plan for updating the at least one of the plurality of services, wherein the remediation plan identifies a time for updating the at least one of the plurality of services to reduce remediation plan implementation effects on others of the plurality of services.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
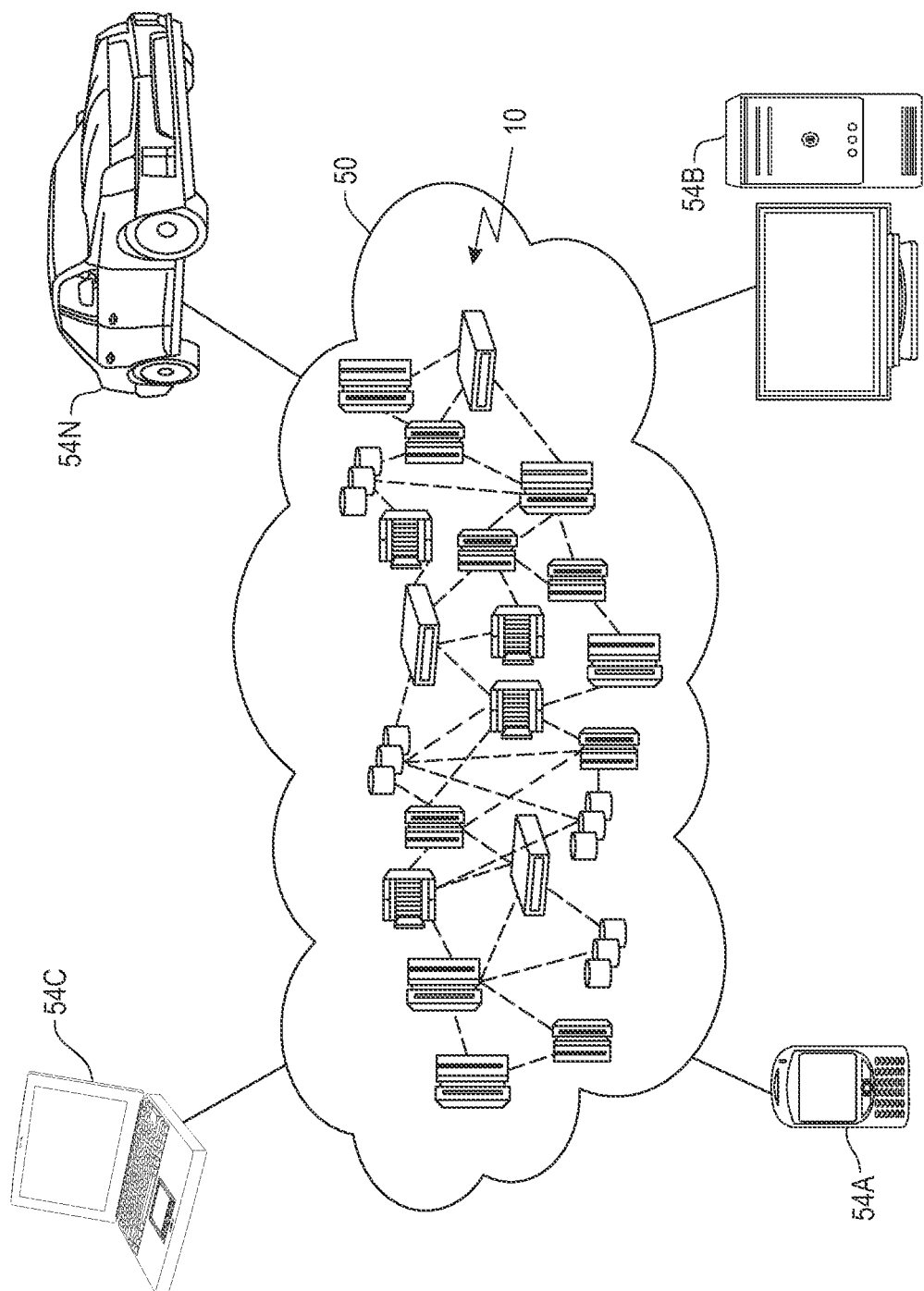
FIG. 1 depicts a cloud computing environment according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
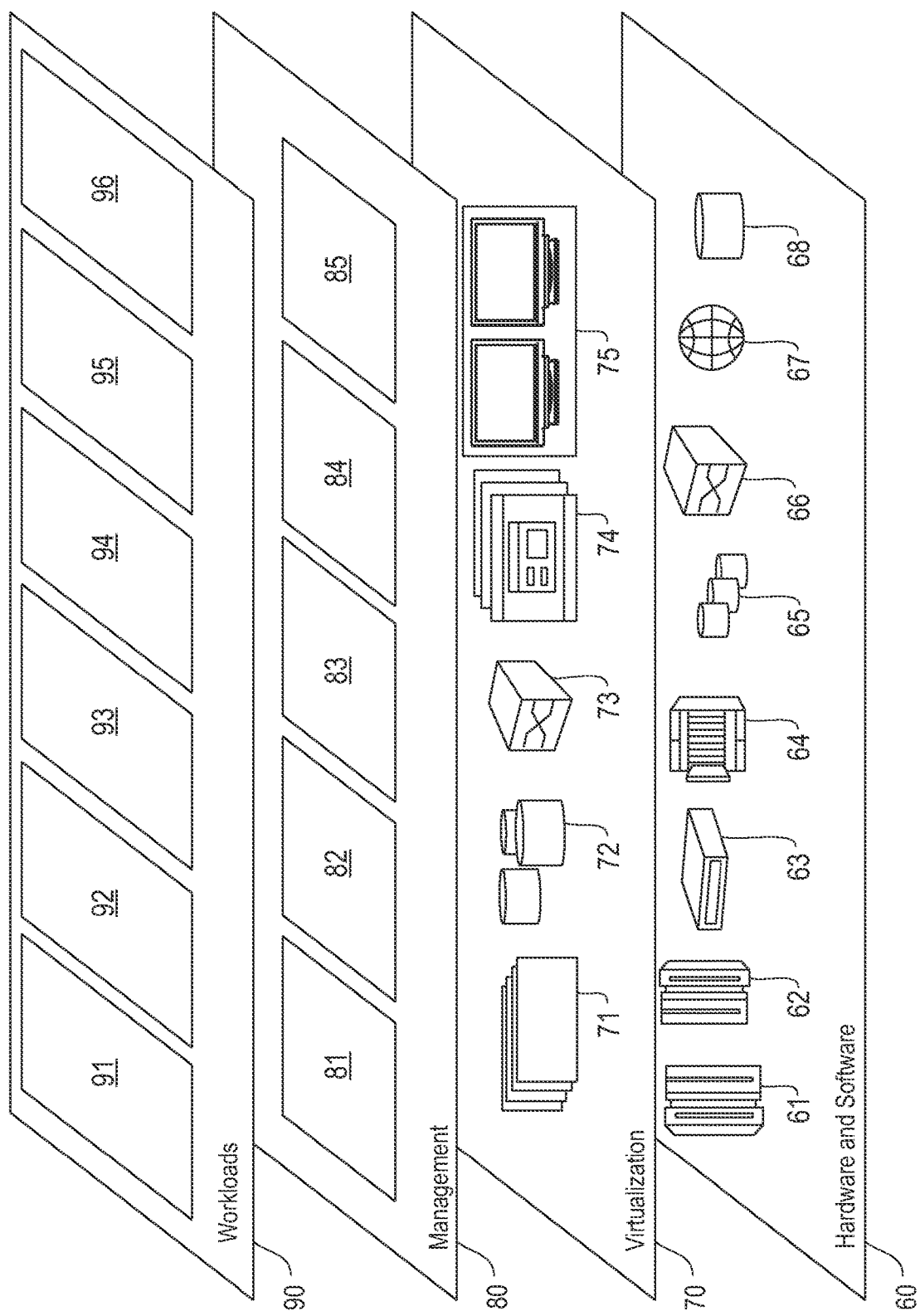
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and services hosting 96.

Generally auditing and remediating services is a manual process performed by users or entities. The term services will be used here throughout to refer to services, software, or other systems, and is not intended to limit the scope of this disclosure to any particular type of service or system. When a user or entity identifies that a service is no longer compliant with requirements or regulations, the user or entity will remove the service from service, remediate or update the service so that it is compliant, and then restore the service back to operation. Removing any service from operation causes an effect on other services or entities. However, in an environment where services are distributed across different data locations and rely on each other to run an application or other service, removing a service from operation can cause an even greater effect on the entire application. For example, many services in a distributed environment, for example, a cloud or hybrid environment, interact with other services within the distributed environment. Thus, when one service is taken out of service for updating or remediation, other services may be effectively taken out of service also. This may cause the entire application to stop performing.

Remediation is generally a manual process where a user identifies the service that needs to be updated or remediated and then takes that service out of operation to perform the updating or remediation. While a user may have a general idea of other services that may be affected by removing the target service from operation, the user generally does not know the degree of effect on the other services and may not know all services that will be affected. Some technologies do allow for an automated remediation process. However, these automated remediation processes do not capture the effects of remediation on interacting services and factor those effects into a remediation plan.

Accordingly, an embodiment provides a system and method for generating a remediation plan for a service that needs updating while taking into account the effect of removing the service from operation on other services, thereby creating a remediation plan that has a reduced effect on other services. The system can receive interaction logs of services of an application running on a system, for example, a cloud or hybrid cloud environment. From the interaction logs the system can generate an interaction graph that identifies interactions between the services of the application and, particularly, those services that interact with a service that needs to be remediated or updated. The interaction graph not only identifies which services interact with other services, but also identifies the frequency of interactions.

From the interaction graph, the system can determine constraints between services of the application and, in particular, constraints between the target service and other services. The constraints identify any services that are dependent on other services and a compatibility of a service with respect to another service. Compatibility may refer to whether one service would be compatibility with another service based upon the version of the service. For example, an interacting service may be able to interact with a target service at a current version level, but may be unable to interact with the target service if the target service were updated to a new version level. Once the interaction graph is generated and the constraints are identified, the system can create a remediation plan for the target service that identifies a time for updating the target service in order to reduce the effects of implementing the remediation plan on other services, for example, interacting services. In other words, the remediation plan takes into account the interacting services, including a frequency of interactions, and constraints between services in order to create a remediation plan that will reduce the effects of remediating the target service on other services within the environment.

Such a system provides a technical improvement over current systems for remediating services, particularly those within a distributed environment. Instead of relying on a user to determine when a service should be taken out of operation, the described system is able to generate a remediation plan that takes into account effects on other services that interact with the target service. By identifying the effects oi other services, the system can generate a remediation plan to reduce the effects of the remediation on the other services. For example, the system may determine an optimal time for remediating the service that would have the least effect on interacting services based upon a frequency of interaction. Such a system is also an improvement over automated techniques since the automated techniques also do not factor the effect on interacting services into the remediation plan. Thus, the described system and method provides a technique for ensuring service compliance while maintaining an increased performance and minimizing downtime as compared to conventional techniques.

Figure 3:
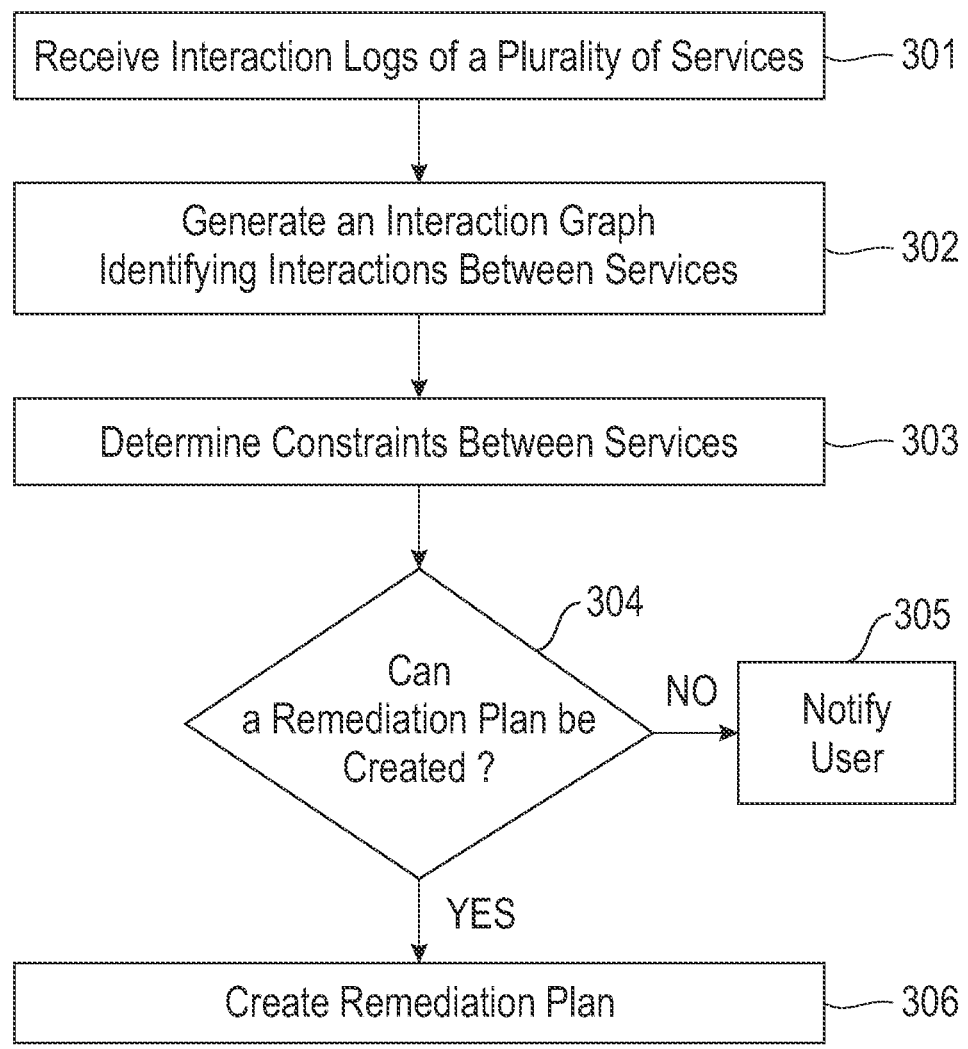
FIG. 3 illustrates a method of generating a remediation plan for updating a service of a plurality of services.

FIG. 3 illustrates a method for generating a remediation plan for a service that needs updating while taking into account the effect of removing the service from operation on other services, thereby creating a remediation plan that has a reduced effect on other services. At 301 the system receives interaction logs of a plurality of services of an application running on a system. In other words, an application may be broken into many different services. Each of these services may perform a single function of the application. However, the services work together in some form to fulfill the overall function of the application. The services may be spread across many different data locations, for example, in a distributed environment like a cloud or hybrid-cloud computing environment or system. As the services perform functions and interact with each other, logs are generated that identify the interactions, when the interactions occurred, which services interacted, a length of the interaction, a type of the interactions, and other information regarding the interactions.

Receipt of the interaction logs may be performed via any technique for receiving, accessing, or otherwise obtaining the interaction logs, for example, a user manually uploading the logs to the system, the system accessing a log location, the system accessing a system or link that includes the logs, mining the interaction logs by monitoring the services, or the like. In the case that the system receives the interaction logs by monitoring the services, the system may identify all interacting services using application end-point information. The system may then mine, filter, and identify interactions from data points that can be obtained from system logs, active probing of services, passive monitoring of services, or the like.

At least one of the services of the plurality of services has been identified as being non-compliant and, therefore, needs to be remediated or updated. This service will be referred to as a target service for ease of readability. To this end, the system utilizes the interaction logs to generate an interaction graph identifying interactions between at least the target service and other of the services that make up the application at 302. For ease of readability, the services that interact with the target service will be referred to as interacting services. The interaction graph may include interactions that occur with only the target service, may include all interactions that occur within the services of the application even if those interactions have no effect on the target service, or a subset thereof.

To generate the interaction graph, the system may parse and filter the interaction logs to identify different services within the interaction logs and also identify which services are interacting with other services. The graph may then be generated with vertices representing a service. The vertices may include additional information, for example, a virtual machine instance, a service update value, service metadata (e.g., restart duration, remediation downtime, module graph of service for impact analysis, etc.), and the like. The service metadata may be identified by accessing a service metadata repository that stores metadata information corresponding to each of the services. The module graph of the service for impact analysis may identify both a duration and a criticality of the update or remediation.

Both the platform (e.g., virtual machine instance) and service may be used to annotate the vertices because both the platform and service may be impacted by or factor into an effect of remediation steps. For example, a remediation step may yield a different impact for the same service if it is hosted on different platforms. For example, a remediation step requiring creating partitions of a disk may be performed more quickly within one platform as compared to a different platform, thereby having an impact on the effect of the remediation step. Additionally, services hosted on the same platform may be affected even if those services do not directly interact with each other. For example, if two services are hosted on a platform that is affected by a remediation step, both services may be affected by the remediation step even though the services may not interact with each other at all. For example, introducing a frequent scan on a platform to monitor a target service can affect the performance of the platform, thereby affecting all services that are hosted on the platform regardless of whether the service interacts with the target service.

Edges can be created between vertices that represent an interaction between the services represented by the vertices that are connected by the edge. The interaction graph may also identify a frequency of interaction between the services, so the system may also keep a record of how frequently a service interacts with another services, for example, every couple of seconds, every five minutes, every hour, once a week, or the like. The interaction frequency information can be used to annotate the edges corresponding to the interacting services. To identify the interaction frequency, the system may observe the rate of information exchange between services.

Figure 4:
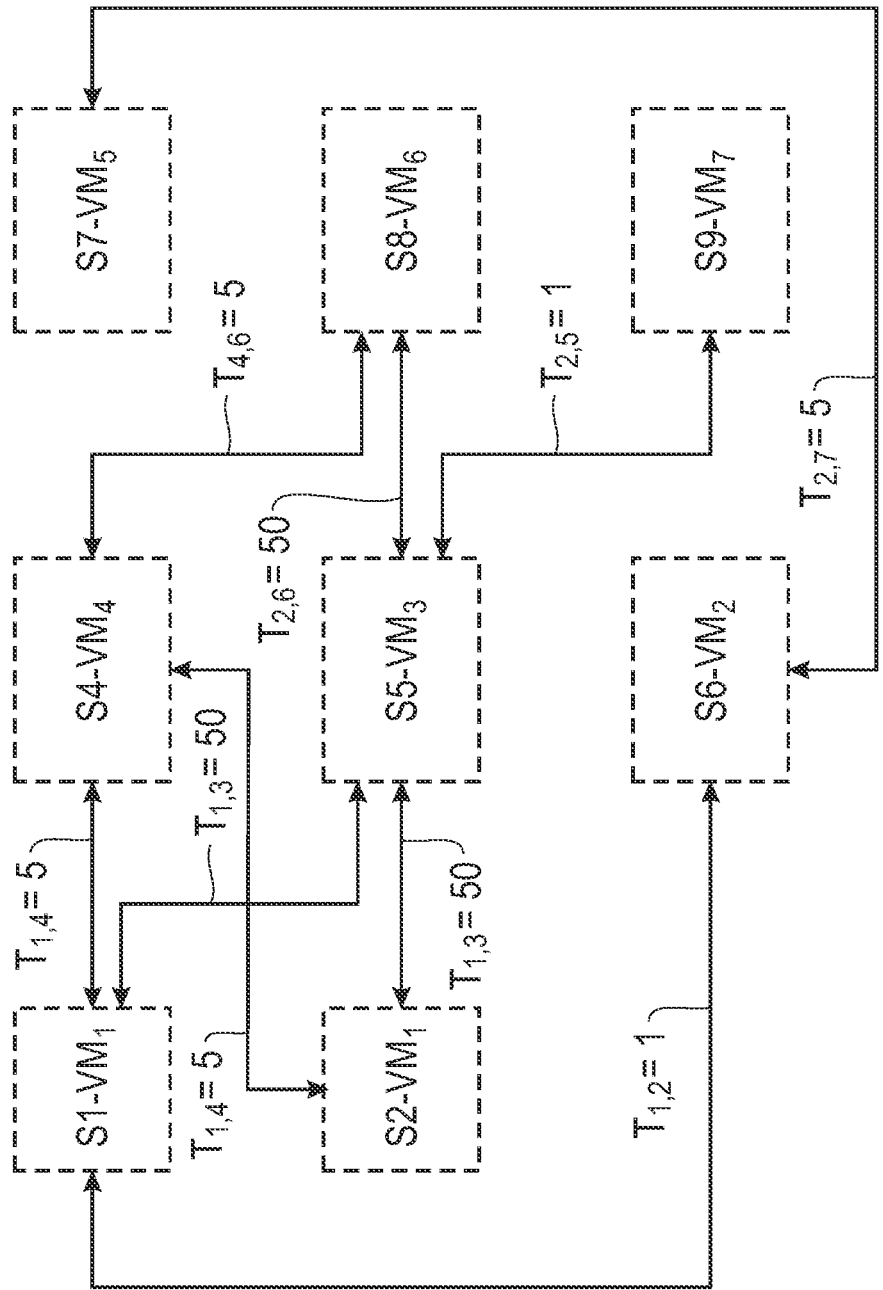
FIG. 4 illustrates an example interaction graph.

An example interaction graph is illustrated in FIG. 4. The vertices, represented by boxes in FIG. 4, correspond to each service within the application. As illustrated in FIG. 4, each of the boxes is annotated with information identifying the service and the virtual machine instance corresponding to the service. Edges connect services that interact with each other. These edges represent direct interactions between services. In other words, while information may be relayed from a first service to a second service via a third service, this indirect interaction between the first service and the second service is not captured in the interaction graph. Rather, using this example, the interaction graph would capture the direct interaction between the first service and the third service and the direct interaction between the third service and the second service. Also illustrated in FIG. 4 are annotations of the edges that represent the interactions and a frequency of the interactions occurring between the connected services.

Once the interaction graph is generated, the system can determine constraints between services of the application at 303. The constraints may identify services that are dependent upon other services and also a compatibility of services with respect to other services. Dependent services are those services that rely on a service to perform a function of the dependent service. Compatibility of services refers to the ability of services to continue to interact with each other based upon an update value of the service. For example, an interacting service may properly interact with the target service while the target service has an update value or version of 1. However, if the target service is updated to an update value or version of 2, the interacting service may no longer be able to properly interact with the target service. Such compatibility may be referred to as backward compatibility which depends on whether a given remediation step or update when applied to a platform or service will render it backward-compatible or not with respect to another platform or service. If both services are backward-compatible then they can be updated independently. Other constraints may be identified, for example, availability of a target service or interacting service, an urgency of the remediation, and the like.

Thus, once the interaction graph is generated and the constraints are identified, the system has identified both service attributes and service constraints. The service attributes may include information describing the service with respect to other services and remediation steps, for example, how long a remediation step would take for a particular service, whether the service interacts with any other services at all (i.e., whether the service is a stand-alone service), how frequently the service interacts with other services, how urgent a remediation is for the service, and the like. Service constraints may identify constraints on the target service based upon an effect of the remediation on interacting services, for example, whether an update to a service would result in an interacting service no longer being able to interact with the updated service properly (i.e., backward compatibility), delay sensitivity between services which refers to, based upon an interaction frequency, how another service would be impacted if the target service is removed from operation, and the like. In view of the service attributes and constraints, the system attempts to maximize the availability of services within the remediation plan.

At 304 the system may determine whether a remediation plan can be created based upon the interaction graph and the determined constraints. To determine if a remediation plan can be created, the system may attempt to create a remediation plan. If the system is unable to create a remediation plan that accounts for the interaction graph and constraints, the system may notify a user at 305. The system may also identify if there is a particular constraint, interaction service or platform, or the like, that is a cause in the inability to create a remediation plan. The system may then wait for user input or feedback before proceeding with creation of the remediation plan.

If, on the other hand, if the system determines that a remediation plan can be created, the system may create the remediation plan at 306. The remediation plan is a plan that identifies a time for updating the target service and also attempts to reduce or minimize the effects of implementing the remediation plan on other services or platforms within the system. The remediation plan may include not only updating or remediating a single service, but may also include updating or remediating a plurality of services. For example, based upon the interaction graph and/or constraints the system may determine that only updating the target service would result in services being unable to interact, other services would be impacted by the remediation in a manner that would result in reduced performance from the service, or the like. Thus, the system may determine that it is best to update not only the target service, but other services in order to ensure that the performance of the services and application meet expectations.

In determining a time for the target services and any other services to be updated, the system may take into account how frequently an interacting service interacts with the target service, as identified from the interaction graph. The system may attempt to schedule the remediation of the target service at a time that occurs between interactions between the target service and interacting services. As an example, if the frequency of interaction between the target service and an interacting service is every hour, and the target service can be updated within forty minutes, the remediation plan would schedule the forty minute target service update to occur between the interactions with the interacting service. Obviously this becomes more complicated when there are more than one interacting services, but the system attempts to schedule a time that would minimize the impact to the interacting services. Minimizing the impact may include scheduling the remediation for a time where the least number of interacting services would need to interact with the target service. Alternatively or additionally, the minimizing the impact may include scheduling the remediation for a time where only lower priority services, services that perform less important functions, services that have few other interacting services, or the like, would be impacted, thereby allowing other services to continue operating as normal.

In determining a time for the target service to be updated the system may take into account scheduled maintenance for either the target service or target service platform or other interacting services or platforms. In other words, if either the target service/platform or interacting services/platforms that the target service/platform is dependent upon are already scheduled to be taken out of operation, the system may determine that the time for the scheduled downtime would be the best time for updating the application. Since the target service/platform or service/platform that the target service is dependent upon will already be out of service, the target service will not be operational at that time. Thus, this would be a good time to remediate the target service because it will already be non-operational and any interacting services will already be affected by the scheduled downtime so no additional impact will be incurred by the interacting services.

In determining a time for scheduling remediation for the target service, the system may also identify other services that can be scheduled for remediation at the same time as the target service. For example, if a service that is dependent upon the target service also needs remediation or updating, the system may determine that the remediation for the dependent service should occur at the same time as the remediation of the target service in order to reduce the overall impact of the remediation on the application and services of the application. It should also be noted that determining a time for scheduling the remediation is also based upon other factors, for example, an urgency of the remediation, a length of time of the remediation, a peak interaction time, or the like. For example, some services may interact more frequently at certain times during the day, so it may be better to schedule the remediation for a non-peak interaction time.

In generating the remediation plan, the system may also determine if a shadow instance of the service should be created during the remediation. A shadow instance is a duplicate of the service at the time that the instance was made. Thus, in the event that it would be detrimental to remove a service from operation for whatever reason, the system may generate a shadow instance that can be implemented while the service is being remediated. The interacting services can then interact with the shadow instance while the service is being remediated.

Thus, the remediation plan factors in the constraints and interactions to formulate a plan with counter-measures to address any constraints or reduce impact to other services/ platforms when implementing the remediation plan. In creating the remediation plan the system attempts to identify as many vertices as possible which could be updated simultaneously while keeping the update time as low as possible. An example method for creating the remediation plan is as follows. The system may sort the remediation steps in descending order of level of urgency of the update. For each level of urgency, the system may add all vertices in the interaction graph into the mandatory set of updates. The system can then mark each vertex by dependency of interaction. For example, the system may add vertices to the mandatory set of updates based upon whether the service becomes unavailable when another service is added to the mandatory set. In other words, if adding one service to the mandatory set would result in another service becoming unavailable or inoperable, for example, based upon backward compatibility, then the other service should be added to the mandatory set. These steps can be repeated until no other vertices can be added to the mandatory set.

For every vertex that is not already in the mandatory set the system may sort these vertices in decreasing order of the level of urgency. The system may then add these vertices to the mandatory set only if the time for implementing the mandatory set would not be increased if the vertex were added to the set. The system can then generate action items within the remediation plan. The action items may be in a particular format, for example, <Platform, Service, RemediationStep, Update-StartTime, CreateShadowInstanceOrNot>. The steps can be repeated until no vertices remain to be addressed for remediation.

Once the remediation plan is created, the system may execute the remediation plan. Before executing the remediation plan the system may present the remediation plan to the user for confirmation that it should be executed. The user may review the remediation plan and make any modifications that the user deems necessary. Once the user has reviewed and/or approved the remediation plan, the system may then implement and execute the remediation plan.

Figure 5:
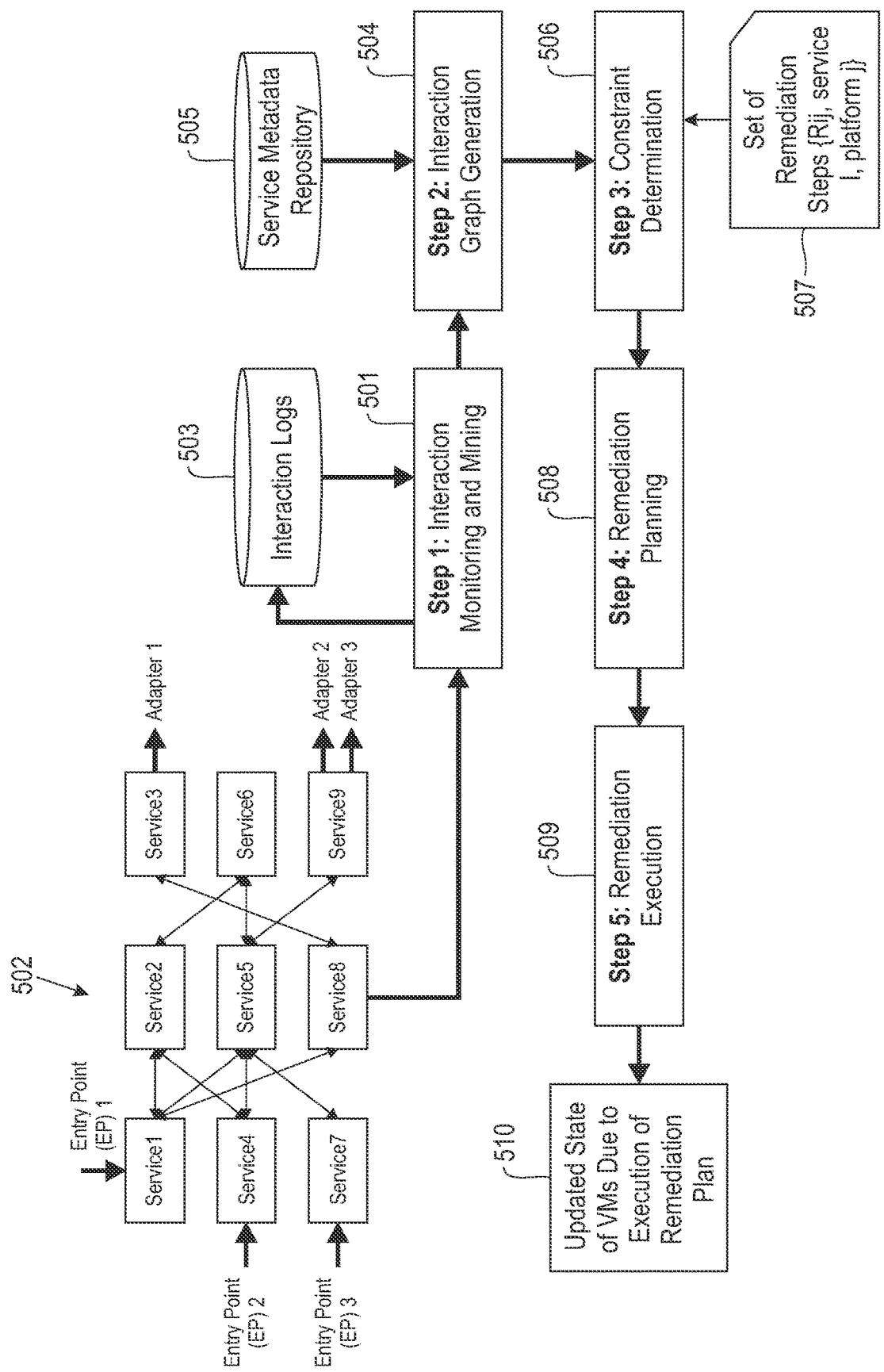
FIG. 5 illustrates an overall system architecture for generating a remediation plan for updating a service of a plurality of services.

FIG. 5 illustrates an overall system architecture of the described system and method. The system performs an interaction monitoring and mining step 501 on a plurality of services 502. From the monitoring and mining the system identifies log data to generate interaction logs 503. The interaction logs and log data from the interaction logs are sent by the interacting monitoring and mining step 501 to the interaction graph generation step 504. The interaction graph generation step 504 may access a service metadata repository 505 that includes metadata about the services such as code, comments, test cases, and the like. This information may be used by the interaction graph generation step 504 to generate an interaction graph that is sent to the constraint determination step 506. The constraint determination step 506 accesses a set of remediation steps 507 that are labelled with a criticality or urgency of the step to annotate the interaction graph with constraints. This annotated interaction graph is sent to the remediation planning step 508 that generates a remediation plan that can be then executed at the remediation execution step 509. The result of the execution is an updated state of the virtual machines and services due to the execution of the remediation plan 510.

Figure 6:
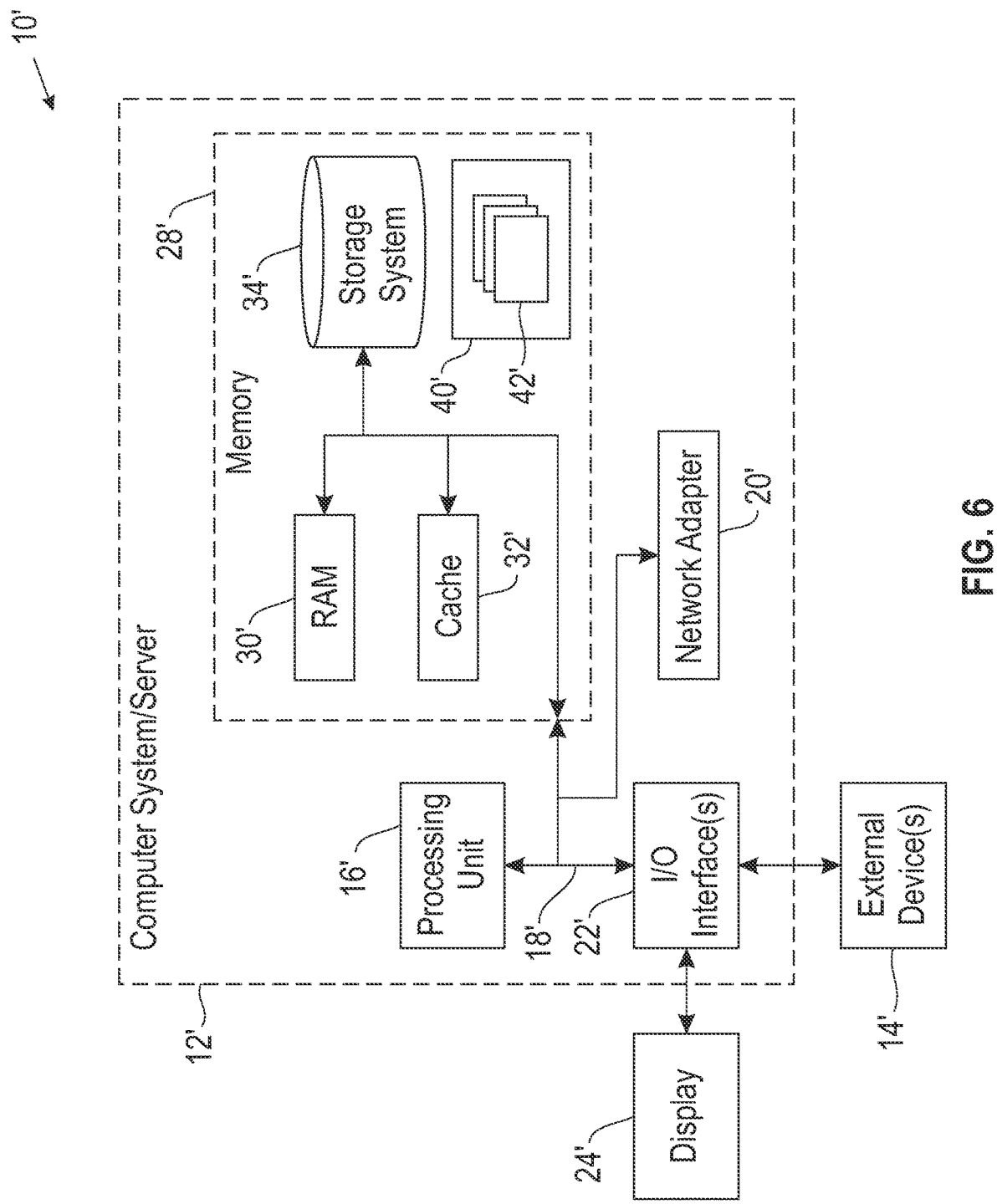
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
receiving, at a remediation plan system, interaction logs of a plurality of services of an application running on a system and identifying interactions between the plurality of services of the application, wherein at least one of the plurality of services requires updating, wherein at least a portion of the plurality of services are located within a first data location and wherein at least another portion of the plurality of services are located within a second data location, wherein the receiving comprises monitoring, using the remediation plan system, the plurality of services utilizing application end-point information and generating at least a portion of the interaction logs from the monitoring;
generating, using the remediation plan system and from the interaction logs, an interaction graph identifying interactions between at least the at least one of the plurality of services and other of the plurality of services, wherein the identifying interactions comprises identifying a frequency of interactions between services of the plurality of services, wherein the generating comprises representing the at least one of the plurality of services as a vertex within the interaction graph and each of the other of the plurality of services as another vertex within the interaction graph and creating edges between vertices representing interactions between vertices connected by an edge and annotating each of the edges with the frequency of interactions;
determining, using the remediation plan system and from the interaction graph, constraints between at least the at least one of the plurality of services and the other of the plurality of services, wherein the constraints identify services that are dependent upon other services of the plurality of services and a compatibility of services with respect to other services of the plurality of services;
creating, using the remediation plan system and based upon the constraints and interaction graph, a remediation plan for updating the at least one of the plurality of services, wherein the remediation plan comprises a plan for updating the at least one of the plurality of services in view of constraints on the at least one of the plurality of services and interactions of the at least one of the plurality of services with other of the plurality of services, wherein the remediation plan identifies and includes other of the plurality of services to be updated in order to maintain compatibility between the updated at least one of the plurality of services and a version of the other of the plurality of services, wherein the remediation plan identifies a time for updating the at least one of the plurality of services to reduce remediation plan implementation effects on others of the plurality of services; and
updating, using the remediation plan system, the at least one of the plurality of services by executing the remediation plan.

2. The computer implemented method of claim 1, wherein the generating comprises parsing the interaction logs to identify different services.

3. The computer implemented method of claim 1, wherein the generating comprises accessing a service metadata repository and generating the interaction graph utilizing service metadata from the service metadata repository and corresponding to the services.

4. The computer implemented method of claim 1, wherein the time comprises a time between interactions with at least one other service identified based upon the frequency of interactions.

5. The computer implemented method of claim 1, wherein the time comprises a time where a service that the at least one of the plurality of services is dependent upon is scheduled for downtime.

6. The computer implemented method of claim 1, wherein the creating comprises scheduling another service for updating while the at least one of the plurality of services is being updated, wherein the another service will be out of operation while the at least one of the plurality of services is updated.

7. The computer implemented method of claim 1, wherein the creating further comprises producing a shadow instance of the at least one of the plurality of services and implementing the shadow instance during execution of the remediation plan.

8. The computer implemented method of claim 1, further comprising executing the remediation plan on the plurality of services.

9. The computer implemented method of claim 1, wherein the creating comprises generating tuples corresponding to the remediation plan.

10. The computer implemented method of claim 1, wherein the application comprises a distributed application running in a cloud environment.

11. An apparatus, comprising:
at least one processor; and
a computer readable storage medium having computer readable program code embodied therewith and executable by the at least one processor;
wherein the computer readable program code comprises code that receives, at a remediation plan system, interaction logs of a plurality of services of an application running on a system and identifying interactions between the plurality of services of the application, wherein at least one of the plurality of services requires updating, wherein at least a portion of the plurality of services are located within a first data location and wherein at least another portion of the plurality of services are located within a second data location, wherein the receiving comprises monitoring, using the remediation plan system, the plurality of services utilizing application end-point information and generating at least a portion of the interaction logs from the monitoring;
wherein the computer readable program code comprises code that generates, using the remediation plan system and from the interaction logs, an interaction graph identifying interactions between at least the at least one of the plurality of services and other of the plurality of services, wherein the identifying interactions comprises identifying a frequency of interactions between services of the plurality of services, wherein the generating comprises representing the at least one of the plurality of services as a vertex within the interaction graph and each of the other of the plurality of services as another vertex within the interaction graph and creating edges between vertices representing interactions between vertices connected by an edge and annotating each of the edges with the frequency of interactions;
wherein the computer readable program code comprises code that determines, using the remediation plan system and from the interaction graph, constraints between at least the at least one of the plurality of services and the other of the plurality of services, wherein the constraints identify services that are dependent upon other services of the plurality of services and a compatibility of services with respect to other services of the plurality of services;
wherein the computer readable program code comprises code that creates, using the remediation plan system and based upon the constraints and interaction graph, a remediation plan for updating the at least one of the plurality of services, wherein the remediation plan comprises a plan for updating the at least one of the plurality of services in view of constraints on the at least one of the plurality of services and interactions of the at least one of the plurality of services with other of the plurality of services, wherein the remediation plan identifies and includes other of the plurality of services to be updated in order to maintain compatibility between the updated at least one of the plurality of services and a version of the other of the plurality of services, wherein the remediation plan identifies a time for updating the at least one of the plurality of services to reduce remediation plan implementation effects on others of the plurality of services; and
wherein the computer readable program code comprises code that updates, using the remediation plan system, the at least one of the plurality of services by executing the remediation plan.

12. A computer program product, comprising:
a computer readable storage medium having computer readable program code embodied therewith, the computer readable program code executable by a processor;
wherein the computer readable program code comprises code that receives, at a remediation plan system, interaction logs of a plurality of services of an application running on a system and identifying interactions between the plurality of services of the application, wherein at least one of the plurality of services requires updating, wherein at least a portion of the plurality of services are located within a first data location and wherein at least another portion of the plurality of services are located within a second data location, wherein the receiving comprises monitoring, using the remediation plan system, the plurality of services utilizing application end-point information and generating at least a portion of the interaction logs from the monitoring;
wherein the computer readable program code comprises code that generates, using the remediation plan system and from the interaction logs, an interaction graph identifying interactions between at least the at least one of the plurality of services and other of the plurality of services, wherein the identifying interactions comprises identifying a frequency of interactions between services of the plurality of services, wherein the generating comprises representing the at least one of the plurality of services as a vertex within the interaction graph and each of the other of the plurality of services as another vertex within the interaction graph and creating edges between vertices representing interactions between vertices connected by an edge and annotating each of the edges with the frequency of interactions;
wherein the computer readable program code comprises code that determines, using the remediation plan system and from the interaction graph, constraints between at least the at least one of the plurality of services and the other of the plurality of services, wherein the constraints identify services that are dependent upon other services of the plurality of services and a compatibility of services with respect to other services of the plurality of services;
wherein the computer readable program code comprises code that creates, using the remediation plan system and based upon the constraints and interaction graph, a remediation plan for updating the at least one of the plurality of services, wherein the remediation plan comprises a plan for updating the at least one of the plurality of services in view of constraints on the at least one of the plurality of services and interactions of the at least one of the plurality of services with other of the plurality of services, wherein the remediation plan identifies and includes other of the plurality of services to be updated in order to maintain compatibility between the updated at least one of the plurality of services and a version of the other of the plurality of services, wherein the remediation plan identifies a time for updating the at least one of the plurality of services to reduce remediation plan implementation effects on others of the plurality of services; and wherein the computer readable program code comprises code that updates, using the remediation plan.

13. The computer program product of claim 12, wherein the generating comprises parsing the interaction logs to identify different services.

14. The computer program product of claim 12, wherein the generating comprises accessing a service metadata repository and generating the interaction graph utilizing service metadata from the service metadata repository and corresponding to the services.

15. The computer program product of claim 12, wherein the time comprises a time between interactions with at least one other service identified based upon the frequency of interactions.

16. The computer program product of claim 12, wherein the time comprises a time where a service that the at least one of the plurality of services is dependent upon is scheduled for downtime.

17. The computer program product of claim 12, wherein the creating comprises scheduling another service for updating while the at least one of the plurality of services is being updated, wherein the another service will be out of operation while the at least one of the plurality of services is updated.

18. The computer program product of claim 12, wherein the creating further comprises producing a shadow instance of the at least one of the plurality of services and implementing the shadow instance during execution of the remediation plan.

19. The computer program product of claim 12, wherein the computer readable program code further comprises code that executes the remediation plan on the plurality of services.

20. The computer program product of claim 12, wherein the creating comprises generating tuples corresponding to the remediation plan.

* * * * *